United States Patent Office 3,208,802
Patented Sept. 28, 1965

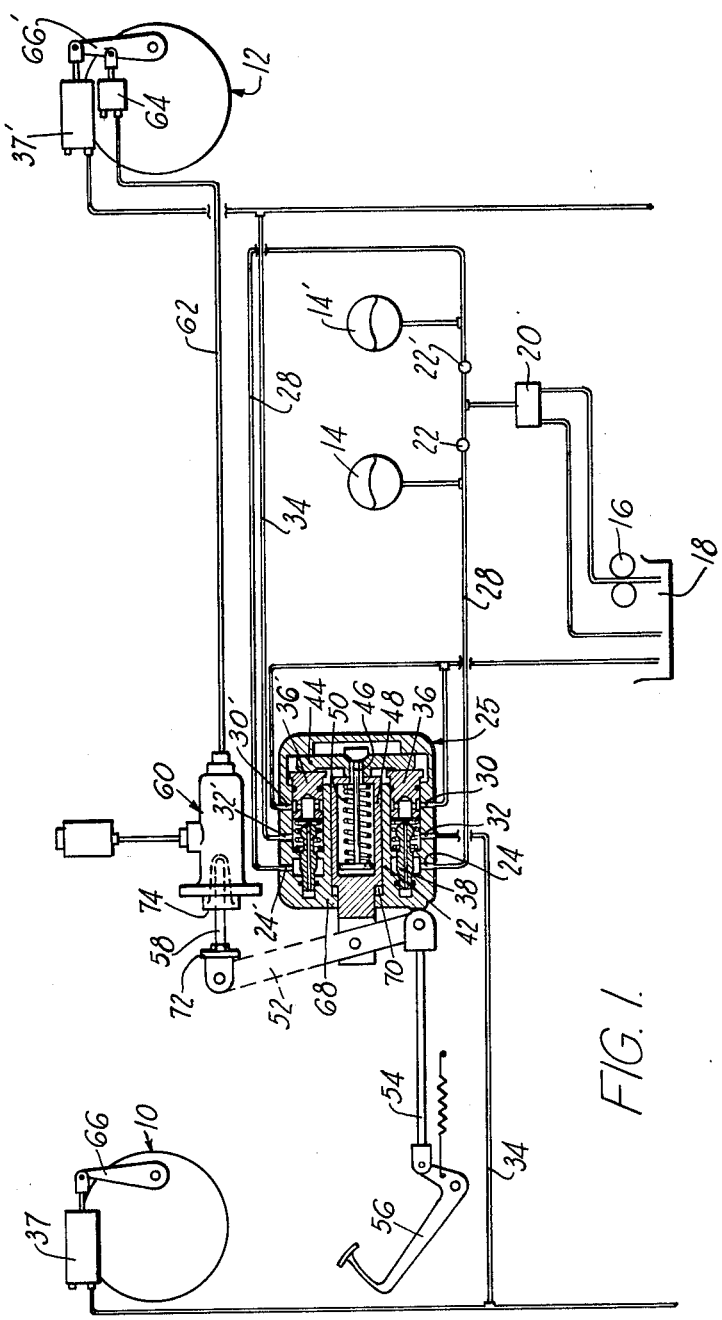

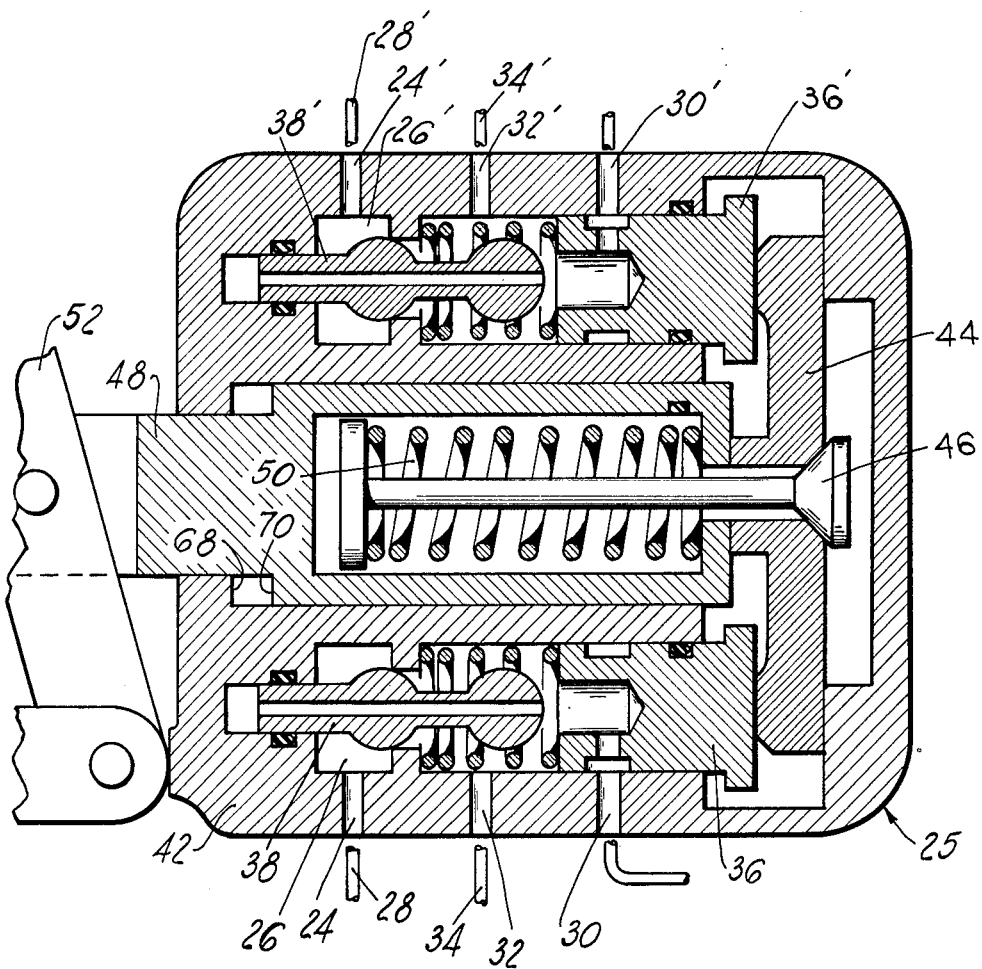

3,208,802
POWER BRAKING SYSTEMS
René Thirion, Paris, France, assignor to Societe Anonyme D.B.A., Paris, France, a company of France
Filed Oct. 21, 1963, Ser. No. 317,417
Claims priority, application France, Oct. 25, 1962, 913,411
3 Claims. (Cl. 303—49)

The invention relates to fluid pressure power braking systems, in particular for automotive vehicles, comprising a valve controlling the fluid pressure supplied to a brake actuator which is generally located far from the control valve, in response to a braking force exerted by the vehicle driver on a brake control member, which is subjected to a reactive force generated by the pressure controlled by the valve.

In conventional systems the reactive force is proportioned to the pressure at the control port of the valve, which pressure substantially differs from the pressure in the brake actuator when the pipes connecting the valve to the actuator have a substantial length and a small cross sectional area and when the fluid flow rate through said pipes is high. Because a resiliently distortable member is generally provided between the brake control member and the valve control device, whereby the stroke of the brake control member is responsive to the force exerted thereon, the reactive force which is transmitted to the brake control member through the resiliently distortable member causes the latter to distort progressively as the controlled pressure increases, and because the pressure at the control port of the valve increases more rapidly than the pressure in the brake actuator, the controlled passage of the valve, through which fluid flows to the brake actuator, is substantially throttled before the pressure in the brake actuator reaches the required value, and this throttling of the fluid flow increases the time required for applying the brakes. This drawback is particularly detrimental when the force exerted on the brake control member is small, because the throttling of the controlled passage in the valve then occurs immediately, while a relatively large amount of fluid is necessary for bringing the brake friction elements into engagement with the opposed friction surfaces of the brake from which they are normally spaced. Moreover, in these systems the stroke of the brake control member is only responsive to the controlled pressure and to the characteristics of the resiliently distortable member, and is not dependent upon the stroke of the brake actuator, so that the driver is not aware of wearing of the brake linings.

The object of the present invention is to eliminate these drawbacks of conventional braking systems, and to provide a power braking system in which the control valve cannot close even partially so long as the controlled pressure does not balance the force exerted on the brake control member, and in which the stroke of the brake control member depends upon the stroke of the brake actuator, whereby the sensation felt by the driver is the same as in a non-power braking system.

In a power braking system according to the invention the control valve is actuated through the intermediary of a lever pivoting on a member operatively connected to the control valve and hydraulically or mechanically connected on the one hand to the brake control member and on the other hand to the brake actuator, whereby the stroke of the brake control member depends upon the stroke of the brake actuator, and the reactive force exerted on said lever and consequently on the brake control member is proportional to the controlled pressure.

The invention will more fully appear from the following description of one embodiment of the invention, which description refers to the drawings in which FIGURE 1 is a schematic view showing a hydraulic power braking system for vehicles in accordance with the principles of my invention with a cross-sectional view of a control valve; and FIGURE 2 is an enlarged cross-sectional view of the control valve of FIGURE 1.

The system shown in the drawing comprises a first braking circuit connected to the front wheel brakes 10 of a vehicle and a second braking circuit generally identical to the first one and connected to the rear wheel brakes 12 of the vehicle. The first braking circuit comprises an accumulator 14 fed by a pump 16 through a governor 20 and a check valve 22. The accumulator 14 is connected to the inlet port 24 of a control valve 25 by a pipe 28. The valve has a bore 26 with an exhaust port 30 which is connected to a reservoir 18, and a control port 32 which is connected by a pipe 34 to the brake actuators 37 of the front wheels, only one of which is shown in the drawing. In the bore 26 I have assembled a plunger 36 and a balanced poppet member 38 which form a valve control device adapted to control the communication between the inlet port 24 and the control port 32 and between the latter and the exhaust port 30.

The second braking circuit comprises an accumulator 14' fed by the pump 16 through the governor 20 and a check valve 22'. The accumulator 14' is connected by a pipe 28' to the inlet port 24' of another bore 26' in valve 25 identical to the bore 26 and which also has an exhaust port 30' and a control port 32' connected by the pipe 34' to the brake actuators 37' of the rear wheels. The two bores 26 and 26' are disposed side-by-side in a housing 42 and are actuated by an arm 44, the ends of which are urged into engagement with the plungers 36 and 36' by a rod 46 pivoted on the arm 44 intermediate its ends, and extending in a sleeve 48, a strong spring 50 being compressed between the open end of the sleeve and the head of the rod and biasing the head of the rod towards the closed end of the sleeve. The sleeve 48 is slidably mounted in the housing 42 and comprises a U-shaped extension which pivotally supports a lever 52.

One end of the lever 52 is connected to a brake pedal 56 by means of a rod 54, and the other end of the lever is connected to a push rod 58 acting on the piston of a master-cylinder 60. This master-cylinder is connected by a pipe 62 to an auxiliary cylinder 64 mounted on one of the rear wheel brakes 12 of the vehicle and having a piston which is connected to the brake lever 66' operated by the brake actuator 37'. A flange 68 formed on the valve housing 42 serves as a stop for a shoulder 70 provided on the sleeve 48 for limiting the outward movement of the sleeve.

When the driver presses on the pedal 56 the plungers 36 and 36' abut first on poppets 38 and 38' and further forces displace the poppets to communicate the inlet ports 24 and 24' to the control ports 32 and 32' respectively. As soon as the pressure is admitted in the brake actuators 37 and 37', the latter actuate the brake levers 66 and 66' and apply the brakes. The rotation of the lever 66' actuating the brake 12 equipped with the auxiliary cylinder 64 allows the piston of the cylinder 64 to move together with the piston of the master-cylinder 60 and the end of the lever 52 to which this latter piston is connected by the push rod 58. Since the spring 50 is strongly precompressed so that it absorbs hydraulic loading on plungers 36 and 36' in yielding slightly thereby proportioning the reaction to be felt by the operator of the brake pedal during normal operation the movements of the sleeve 48, which equal those of poppet members 38 and 38' and are very small, and it may be considered that the lever 52 is pivoted on a substantially fixed axis. As the piston of the master-cylinder 60 moves, the lever 52 is allowed to turn and the brake pedal 56 is allowed to move over a stroke which is proportional to the rotation angle of the brake lever 66' associated with the cylinder 64. As the brake linings are wearing the rotation angle of the brake levers and consequently the pedal stroke will be increasing, and thus the driver will be aware of the wearing of the brake linings. After the brake shoes were brought into engagement with the friction surfaces of the brake drums, the pressure in the brake actuators increases until the reactive force exerted by the control device of valve 25 on the lever 52 balances the force exerted on the pedal 56. Then the plungers 36 and 36' move back so that inlet pressure on poppets 38 and 38' disconnects the inlet ports 24 and 24' from the control ports 32 and 32' respectively, and the pressure in the brake actuators stops increasing. For releasing the brakes the force on the pedal 56 is decreased to zero, and then the plungers 36 and 36' move away from poppets 38 and 38' to communicate the control ports 32 and 32' with the exhaust ports 30 and 30'. The pressure in the brake actuators 37 and 37' decreases to a zero value, the brake shoes and brake levers are returned to their rest positions by return springs, and the piston of the master-cylinder 60 is also returned to its rest position by the liquid exhausted from the cylinder 64.

In case of failure of the hydraulic transmission between the cylinders 60 and 64 due to rupture of the pipe 62 or to leakages in the cylinders, a washer 72 secured to the push rod 58, adjacent to the end of lever 52, is brought into engagement with a shoulder 74 provided on the master-cylinder body. This end of the lever 52 then takes abutment on the master-cylinder body and the plungers 36 and 36' can be normally actuated. In this case the driver will not feel a reaction until the washer 72 is brought into engagement with the shoulder 74, and he will then be aware that the system fails to operate normally, but he will be able however to control the braking operation since the plungers 36 and 36' will provide a reaction proportional to the controlled pressure.

The arm 44 is operative to balance the pressures in both braking circuits. As taught above, the precompression of spring 50 is such that it does not yield during normal operation. Thus, as the brake pedal 56 is pivoted the sleeve 48 and the rod 46 are pulled as if they were integral to reciprocate the plungers 36 and 36' to actuate the brake actuators 37 and 37' as aforementioned. However, when an excessive force is exerted on the brake pedal 56, the spring 50 yields slightly to allow the sleeve 48 to come into abutment with the flange 68 of the housing; thereafter any additional force on the brake pedal is resisted by the flange 68, and does not act on the plungers 36 and 36', so that the controlled pressure is limited to a higher value corresponding to the force required for compressing the spring 50.

The auxiliary cylinder 64 is preferably mounted on the brake or set of brakes which is the most subject to wear.

In the system shown in the drawing, the auxiliary cylinder is associated with only one brake of one vehicle axle, and the additional force exerted on the corresponding brake lever is capable of causing a slight unbalance between the braking torques on the wheels of this axle; a spring could be provided to balance the action of the auxiliary cylinder. Although a hydraulic connection is used in the system shown in the drawing for connecting the lever 52 to the brake lever 66', these levers could be connected mechanically by means of a linkage or a Bowden mechanism.

A single control valve bore could be used in place of the twin valve, bores shown for controlling both braking circuits associated with the front and rear wheel brakes, or a control valve could be used which proportionates the braking pressures in the front and rear braking circuits to the load on the front and rear wheels of the vehicle.

It must be noted that the invention is not only useful in hydraulic braking systems, but also applies to pneumatic braking systems.

I claim:
1. A fluid pressure braking system comprising:
    a brake actuator having an element movable in response to fluid pressure for applying a brake;
    a control valve for controlling fluid pressure in said brake actuator;
    a brake pedal means including a lever pivotally connected to said control valve;
    a first fluid pressure means operatively connected to said element and arranged to have increasing fluid volume as said element is movable in response to fluid pressure for applying the brake;
    a second fluid pressure means operatively connected to said lever and arranged to displace a fluid volume as said lever is pivoted; and
    a hydraulic link communicating said first and second fluid pressure means supplying fluid displaced from said second fluid pressure means to said first fluid pressure means to control the attitude of said lever about its pivotal connection with said control valve in accordance with the permissible travel of said element.

2. A fluid pressure braking system according to claim 1 and further comprising a fixed abutment for limiting the pivoting of said lever under the action of a brake applying a force exerted on said brake pedal means.

3. A fluid pressure braking system according to claim 1 wherein said second fluid pressure means is characterized as including a fixed abutment associated with the connection thereof with the lever for limiting the rotation of said lever about the pivot connection with said control valve under the action of a brake applying force exerted on said brake pedal means.

References Cited by the Examiner
UNITED STATES PATENTS

| 2,887,187 | 5/59 | Fletcher et al. | 188—152 |
| 3,047,341 | 7/62 | Alfieri | 303—2 X |

FOREIGN PATENTS

| 689,912 | 10/53 | Great Britain. |
| 869,266 | 10/41 | France. |

EUGENE G. BOTZ, *Primary Examiner.*

FERGUS S. MIDDLETON, *Examiner.*